Aug. 17, 1948.  E. C. HORST, JR  2,447,122
HOP PICKING MACHINE
Filed Sept. 6, 1943  4 Sheets-Sheet 1

INVENTOR.
Emil C. Horst Jr.
BY
Castberg & Roemer

Aug. 17, 1948.  E. C. HORST, JR  2,447,122
HOP PICKING MACHINE
Filed Sept. 6, 1943  4 Sheets-Sheet 2
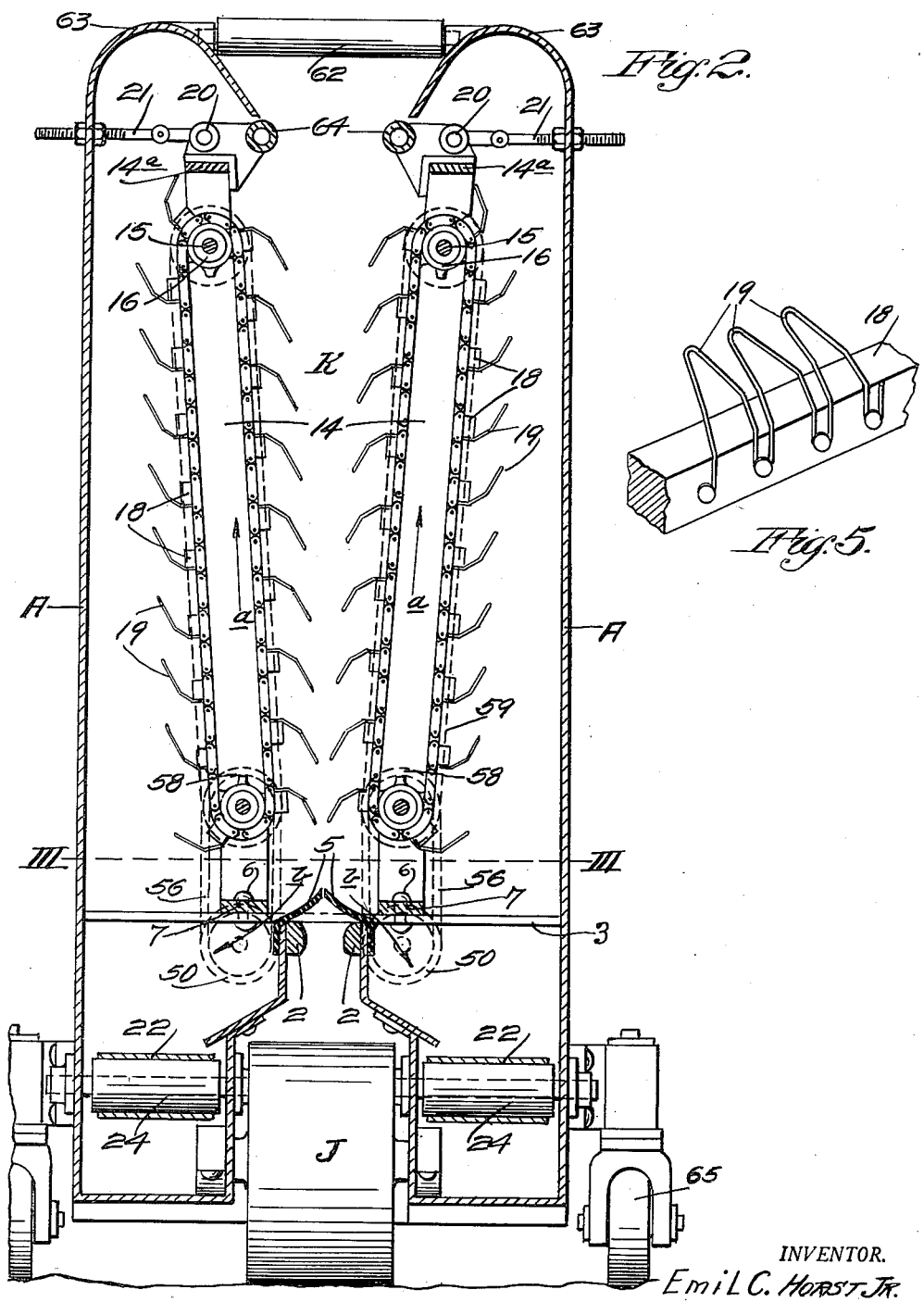
INVENTOR.
Emil C. Horst Jr.
BY
Castberg & Roemer.

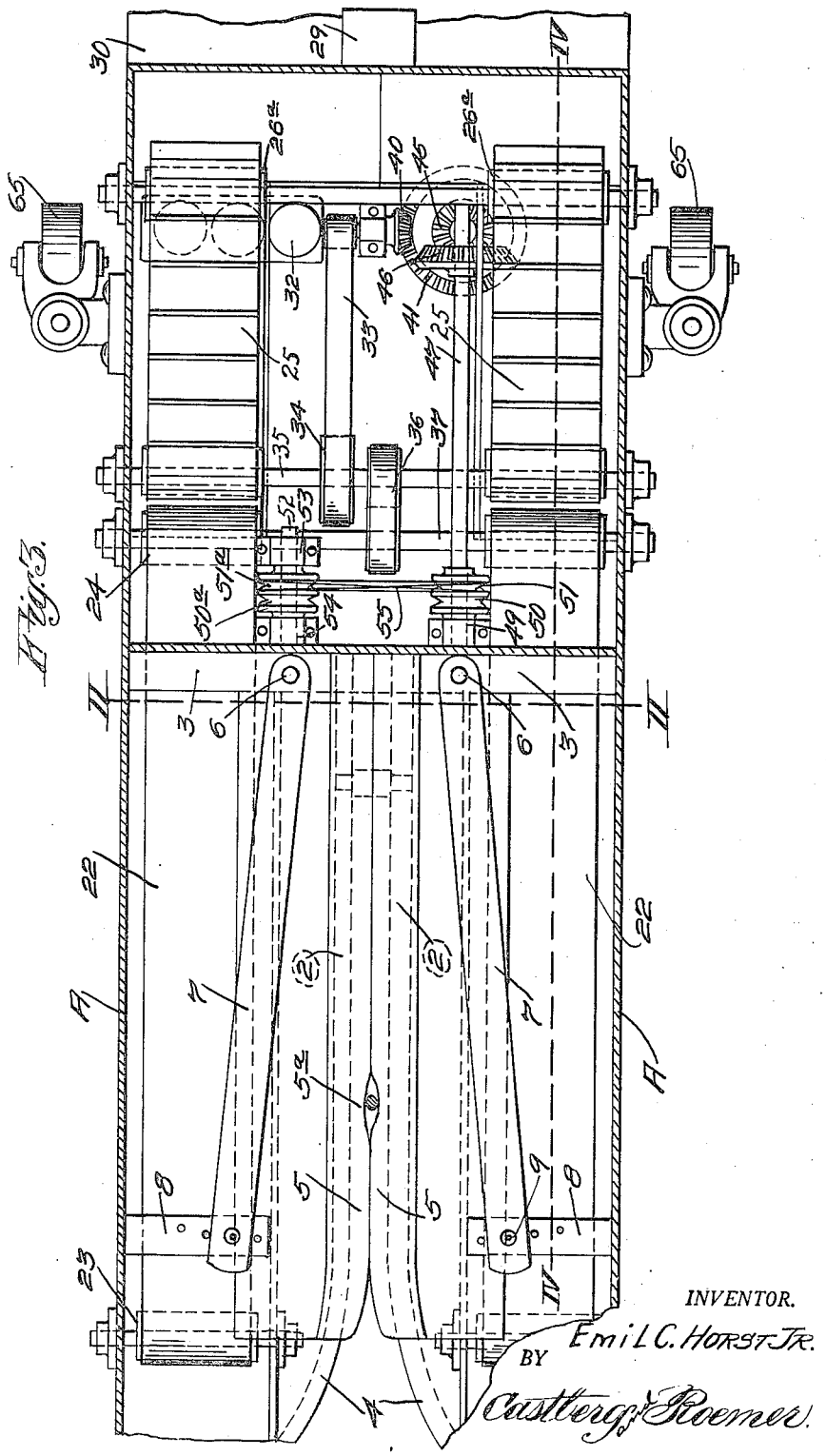

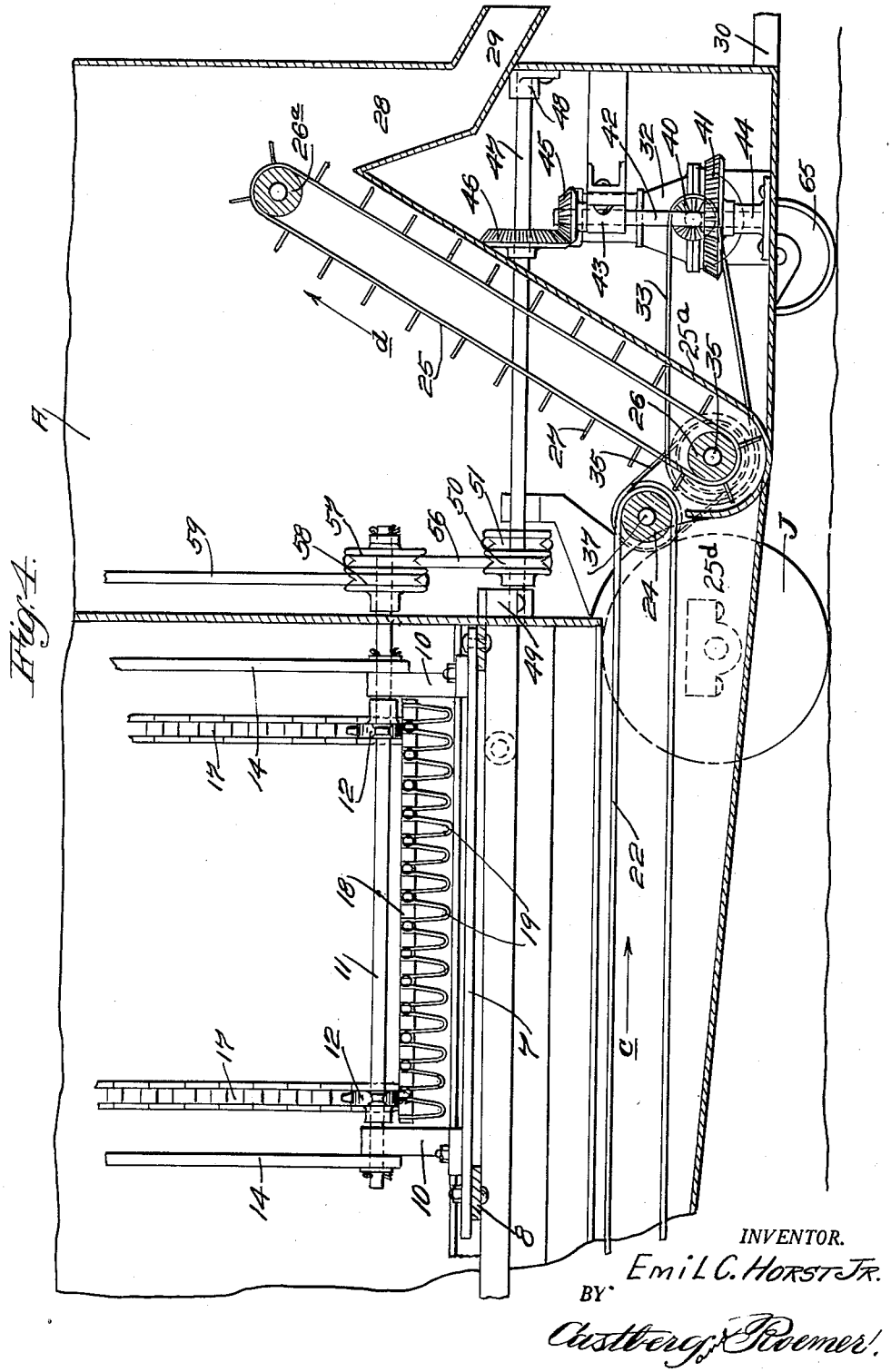

Patented Aug. 17, 1948

2,447,122

UNITED STATES PATENT OFFICE 2,447,122

HOP PICKING MACHINE

Emil C. Horst, Jr., San Francisco, Calif., assignor to E. Clemens Horst Company, San Francisco, Calif., a corporation of New Jersey Application September 6, 1943, Serial No. 501,446

9 Claims. (Cl. 56—130)

This invention relates to a method and a machine for picking hops and especially to a method and a machine whereby hops may be picked directly from the hop vines in the fields in which they grow.

There are two types of hop picking machines in general use at the present time, to wit, a stationary and a portable type. Where stationary machines are used, the hop vines are cut off in the fields and loaded on trucks or wagons and hauled into the stationary machine where they are removed and attached to grasper bars which pull the hop vines between revolving drums or travelling belts equipped with V-shaped wire fingers which comb the vines and strip or remove the hops and most of the leaves. The picked hops and leaves are then delivered to separator belts where the leaves and stems and other foreign material are separated from the hops, and clean hops are finally obtained.

The portable type of machine operates in substantially the same manner, the principal difference being that the portable machine travels in the fields where the hops grow, and as the machine advances, the hop vines are cut down and attached directly to grasper bars which pull the vines through the machine with the result that the hops and leaves are stripped off and then delivered to separators to finally obtain the clean hops.

From the foregoing, it will be noted that whether a portable or stationary machine is employed, the hop vines must be cut off and attached to grasper bars in order to feed or pull them through the machines where the stripping or picking operation takes place.

The object of the present invention is to provide a new method and machine whereby hops may be picked directly from the vines in the field without the necessity of cutting the vines free from the plant or root from which they grow; to provide a portable machine which straddles and travels along a row of hop vines and as it travels, combs the hop vines in an upward direction thereby more efficiently removing the hops which hang singly and in clusters generally beneath the leaves and arms of the hop vines; and further, to provide a machine in which grasper bars together with associated mechanism is entirely eliminated and the machine proper very materially simplified, this being accomplished by providing a roller which rolls over the stalk of the vine and with sufficient traction to pull the vine downwardly through the combing or picking fingers of the machine as the machine advances.

The machine and the method of operating the same is shown by way of illustration in the accompanying drawings, in which:

Fig. 2 is a vertical transverse section of the machine taken on line 2—2 of Fig. 3;

Fig. 3 is a horizontal section taken on line 3—3 of Fig. 2;

Fig. 4 is a longitudinal section partially broken away taken on line 4—4 of Fig. 3; and Fig. 5 is a perspective view of a portion of a picker bar showing the shape and construction of the picking fingers.

Figure 1:
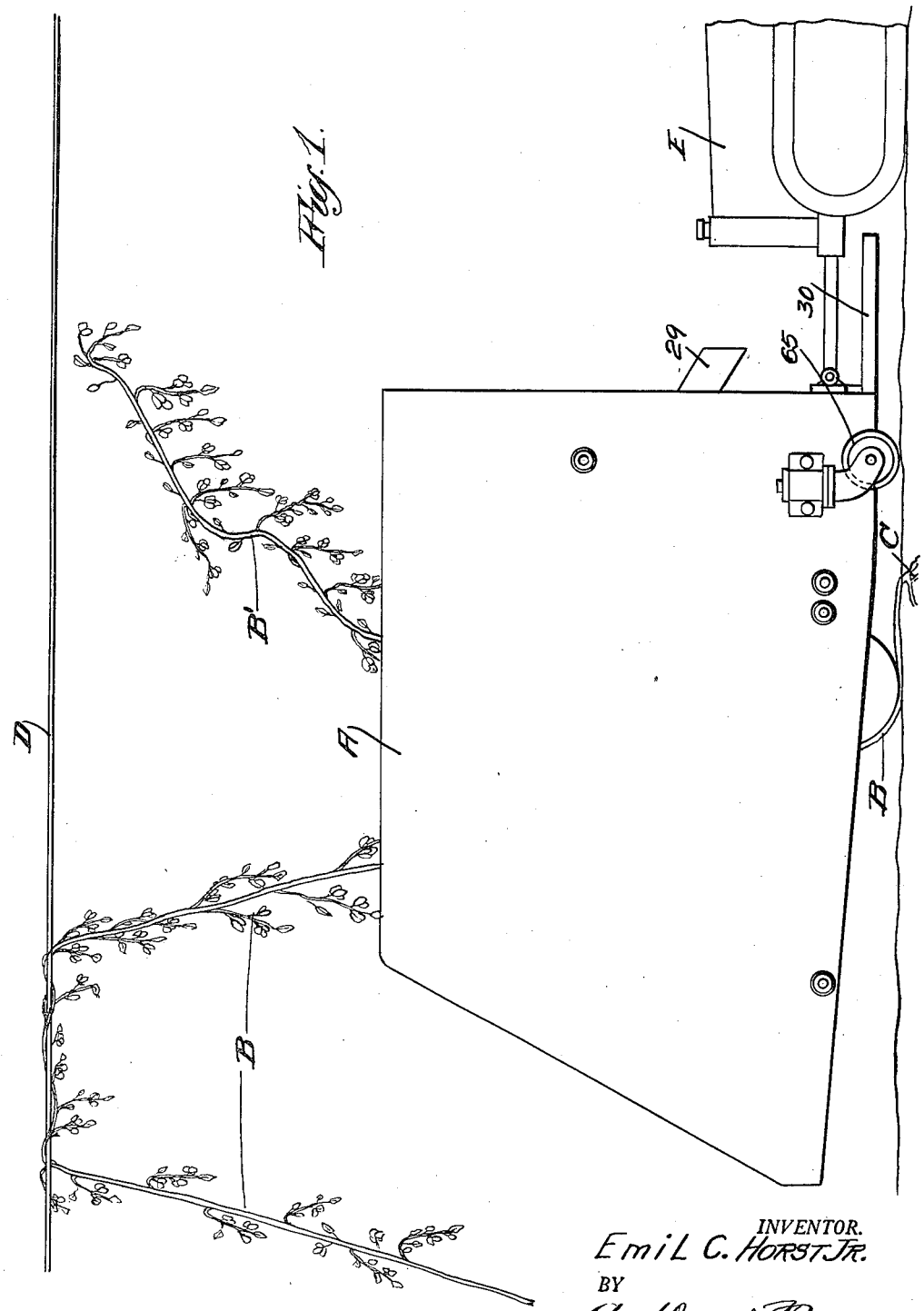
Fig. 1 is a side elevation of the hop picking machine showing it straddling and travelling along a row of hop vines.

Referring to the drawings in detail, and particularly Fig. 1, A indicates the housing of the hop picking machine forming the subject matter of the present application. The machine is designed to straddle and travel along a row of hop vines such as indicated at B, said hop vines growing from a root system C and extending upwardly to an overhead trellis or wire D. The machine may be propelled in any suitable manner or it may be pushed along a row of hop vines by means of a tractor such as indicated at E.

A pair of spaced guide rails 2—2 (see Figs. 2 and 3) extend longitudinally of the machine. Their inner ends are supported by a cross-bar 3. They extend forwardly from this cross-bar and are parallel for a considerable distance, but at their outer ends they are bent outwardly as indicated at 4 to spread them considerably at least to an extent that the outer ends form a mouth which may be four to six feet wide. Overlaying the guide rails and extending substantially from end to end thereof are a pair of rubber flaps 5—5, the function of which will hereinafter be described. Pivotally mounted on each side of each guide rail as at 6 is a frame bar 7. The forward ends of said frame bars are supported by cross arms 8—8. These cross arms have a number of perforations formed therein and thereby permit the arms 7 to be swung about their pivots 6 and to be secured when swung or adjusted to or away from each other by means of bolts 9. Secured on each bar 7, and adjacent opposite ends thereof (see Fig. 4) are bearing blocks 10—10. Extending through said bearings and parallel to the bar 7 are shafts 11 on which are secured sprocket gears 12—12. Pivotally mounted on the shaft 11 are upwardly extending frame arms 14—14 and extending through the upper ends of said vertical bars and journalled therein are shafts 15—15 on which are secured pairs of sprocket gears 16—16. Endless chains such as shown at 17—17 connect the respective pairs of sprocket gears. The chains in turn form supports for cross-bars 18 and these in turn support V-shaped picking fingers 19, the function of which will hereinafter be described. The sprockets 12 and 16, and the chains 17 connecting them form supports for the cross bars 18 and the picking fingers 19, and as the cross bars are fairly closely spaced, as shown in Fig. 2, a pair of endless picking belts are formed, one of which is disposed on one side of the guide rails 2, and the other of which is disposed on the other side of the opposite guide rail 2. The upper ends of the vertical bars 14 are connected by top bars 14a and these in turn carry brackets 30 to which are attached adjusting rods 21 whereby the vertical angle of the endless picker belts may be adjusted, that is the upper ends may be moved inwardly or away from each other as the case may be. The bottom bars 7, the bearing boxes 10 secured thereto, the vertical bars 14 pivoted on the shafts 11 and the top cross bars 14a, constitute rectangular shaped frames in which the endless picker belts are supported. These frames are pivoted at the lower ends as at 6, so that the outer ends may be swung to or away from each other, and as the upper ends of the frames are connected to the adjustable rods 21, their vertical inclination can also be adjusted.

The endless picking belts when operating travel upwardly or in the directions indicated by arrows $a$ in Fig. 2. As the fingers 19 are constructed of spring steel wire or the like, and are more or less V-shaped as shown in Fig. 5, it is obvious that if a hop vine is disposed in the space K (see Fig. 2) formed between the endless belts, that as the V-shaped fingers travel upwardly, they are combing the vines and arms in an upward direction, and thereby efficiently remove the hops as these hang singly or in clusters on the underside of the vines and arms and generally under the leaves. As the hop vines are being combed in the manner described by the wire picking fingers, the hops fall downwardly in the space K and on top of the rubber flaps 5. These flaps direct the hops laterally or side-ways as indicated by the arrow $b$ (see Fig. 2) on two endless conveyor belts 22—22. They are supported by rollers or pulleys 23 and 24 at opposite ends, and carry the hops rearwardly in a continuous flow. An elevating conveyor consisting of an endless belt 25 is disposed at the inner end of each conveyor belt 22. These elevating belts are supported by rollers or pulleys 26 and 26a, and the belts are provided with lifts or flights 27 which receive the hops and carry them upwardly in the direction of arrows $d$ a trough having a bottom section 25a in an upturned end 25d cooperating with the belt to prevent spilling or loss of hops. At the upper end they discharge into a hopper 28 which in turn discharges into a spout 29. A sack may here be applied and the hops and leaves are sacked by a sacker standing on a rear platform 30. As each sack is filled, it is tied and thrown to one side where it may later be picked up and hauled in by a truck or wagon for further treatment as will hereinafter be described.

Power to operate the endless picking belts, the conveyors 22 and the elevators 25 may be supplied from any suitable source. For instance, from an engine such as indicated at 32 (see Figs. 3 and 4). Power from this engine may be transmitted through a belt 33 to a pulley 34 secured on the shaft 35 which carries the pulleys 26 of the respective elevator belts 25. These elevators will accordingly be continuously driven from the engine. In order to impart power to drive the endless conveyors 22, power may be transmitted from shaft 35 through a belt 36 to a shaft 37 on which is mounted the pulleys 24. In this manner the conveyors 22 are continuously driven. Power also must be transmitted to the endless picking belts and this is accomplished as follows:

Secured on the outer end of the engine shaft is a bevel gear 40 which meshes with a bevel gear 41 secured on a vertical shaft 42. This shaft is journalled in upper and lower bearings 43 and 44 and carries a bevel gear 45 at its upper end which meshes with a bevel gear 46 secured on a shaft 47. This shaft extends longitudinally of the machine and is journalled in bearings 48 and 49. Secured on the shaft 47 are two pulleys 50 and 51 and secured on a shaft 52 journalled in bearings 53 and 54 are a pair of complementary pulleys 50a and 51a. A cross belt 55 transmits power from shaft 47 to shaft 52. The pulley 50 transmits power through a belt 56 to a pair of pulleys 57 and 58. These pulleys are loosely mounted on the shaft 11 of one of the picker belts. Pulley 58 in turn transmits power through a belt 59 to a pulley on shaft 15, complementary to the shaft 11 and thus drives one picker belt. The picker belt on the opposite side is driven from the pulley 50a in the same manner as clearly shown in Fig. 2 and continuous movement to the respective picker belts is thus transmitted.

In actual operation, the machine here disclosed is pushed forward by means of a tractor or the like as shown in Fig. 1. The machine is steered to straddle a row of growing hop vines and as it travels forwardly, the main stalk or vine of a hop vine will be engaged by the outwardly flaring ends 4 of the respective guide rails, and will be directed inwardly between them and the rubber flaps 5 which will yield as the stalk or vine moves inwardly between the guide rails, or in other words, as the machine advances. The manner in which the rubber flaps yield is indicated at 5a in Fig. 3. That is, they spread apart around the stalk of the vine as the machine advances and they again come together behind the stalk or vine. Thus comparatively little, if any, space is left for hops to fall through when the machine is picking.

As the hop vines enter between the picking belts and as these travel in an upward direction as indicated by the arrows $a$—$a$, it is obvious that the V-shaped fingers will comb the hop vines in an upward direction thereby efficiently removing the hops and permitting them to drop either through the picking belt on down through the space K on to the rubber flaps 5 which directs them side-ways or laterally to the conveyors 22. As the hop vines enter between the forward ends of the picker belts, the belts are comparatively widely separated as the vines are full of hops and are bulky. As the machine advances and the hops are picked off, the vine is reduced in diameter and bulk, and it is for this reason that the inner ends of the picker belts are disposed closely together, in fact, so close as shown in Fig. 2, that the picking fingers practically contact. In other words, as the vine reaches the inner ends of the endless picking belts, all hops are practically removed, and the final combing or stripping is given at the innermost end.

In the stationary and portable machines heretofore referred to, grasper bars are required to feed the hop vines through the machine and it is furthermore required that the vines be cut free from the roots or plants from which they grow in order that they may be attached to the grasper bars. In this machine, grasper bars and all associated mechanism and the power required to operate them is entirely eliminated. This is made possible by providing the roller generally indicated at J. That is, as the machine advances along a row of hop vines, the roller will roll over the root portion C and on to the stalk B of the vine (see Fig. 1). As the roller rides on the ground and exerts considerable pressure thereon, sufficient traction is provided to pull the vine downwardly between the picking belts as the machine advances.

In the beginning of the season twine is strung from points adjacent the root up to an overhead trellis wire D and the hop vines as they grow climb up the twine leaders. Hence, the only portion of the hop vine that needs to be released is the upper portion which together with the twine is attached to the overhead trellis wire. This may, when necessary, be accomplished by poles having a hook shaped knife at its upper end which merely hooks on to and cuts the vines free. Many vines will pull free without use of a knife. They are freed in this manner, as the machine advances, and they thus fall downwardly as indicated by the vine at B' in Fig. 1. When freed, they fall rearwardly over the housing and in that case are guided downwardly between the picking belts by a rear roller 62 (see Fig. 2). On the other hand, if the vine falls to either side of the housing, the upper end of the housing will be rounded as indicated at 63 on each side of the space K and guide rollers 64 are provided at the upper ends of the picker belt frames and extend longitudinally thereof. Hence, guiding surfaces and rollers are provided no matter in what direction the vines fall when finally released, and little drag or resistance is encountered as the machine advances. This also releaves the root system C of any pull as most of the traction is taken up by the roller J. All hops and leaves which are stripped off during the picking operation are carried rearwardly as previously stated by the endless belts 22 and then delivered to the elevating belts 25 which in turn deliver them to the hopper 28 and the spout 29 where they are sacked. After sacking, the sacked hops may be hauled into a separating plant where the hops are separated from the leaves and stems but it is obvious that separator belts may be applied to the present machine, if so desired, so that a complete clean product may be obtained.

It will be noted from Fig. 4 that the heavier parts of the machine such as the engine 32, etc., are positioned toward the rear; caster wheels 65 are accordingly provided to take part of the weight or load and also to make it easy to steer. While this and other features of the invention have been more or less specifically described and illustrated, I wish it understood that various changes in form, construction and proportion may be resorted to within the scope of the appended claims, and that the materials and finish of the parts employed may be such as the experience and judgment of the manufacturer may dictate or varying uses may demand.

Having thus described my invention, what I claim and desire to secure by Letters Patent is:

1. A machine for removing hops directly from vines in a field, comprising a frame having a pair of spaced guide rails extending a substantial length of the frame, said guide rails adapted to straddle a row of hop vines and said guide rails being flared outwardly at their forward ends to engage and guide hop vines between the rails, a picker frame disposed one adjacent each guide rail, an endless vertically disposed picker belt carried by each picker frame, means for adjusting said picker belts and frames to assume a horizontal angle with relation to the guide rails, other means for adjusting the picker belts to assume a vertical angle with relation to hop vines entering between the guide rails, means for imparting continuous upward movement to the picker belts to comb the vines in an upward direction to remove the hops, means for advancing the machine longitudinally of the row of hop vines while the picking belts are in operation, a roller carried by the machine and in contact with the ground, said roller aligning with the space formed between the guide rails and overriding the vines so as to pull them downwardly between the picking belts when the machine is advancing, a rubber flap extending longitudinally of each guide rail, said rubber flaps extending over the guide rails and being sufficiently yielding to permit a hop vine to pass between them, said flaps forming a cover over the space formed between the guide rails to prevent hops from dropping through and an endless continuously moving conveyor belt below each hop picking belt to gather and remove the picked hops.

2. A machine for removing hops directly from the vines in the field, comprising a frame having a pair of spaced guide rails extending a substantial length of the frame, said guide rails adapted to straddle a row of hop vines and said guide rails being flared outwardly at their forward ends to engage and guide hop vines between the rails, a picker frame disposed one adjacent each guide rail, an endless vertically disposed picker belt carried by each picker frame, means for adjusting said picker belts and frames to assume a horizontal angle with relation to the guide rails, other means for adjusting the picker belts to assume a vertical angle with relation to hop vines entering between the guide rails, means for imparting continuous upward movement to the picker belts to comb vines in an upward direction to remove the hops, means for advancing the machine longitudinally of the row of hop vines while the picking belts are in operation, a roller carried by the machine and in contact with the ground, said roller aligning with the space formed between the guide rails and overriding the vines so as to pull them downwardly between the picking belts when the machine is advancing, a rubber flap extending longitudinally of each guide rail, said rubber flaps extending over the guide rail and being sufficiently yielding to permit a hop vine to pass between them, said flaps forming a cover over the space formed between the guide rails to prevent hops from dropping through, an endless continuously moving conveyor belt below each hop picking belt to gather and remove the picked hops, and a roller journalled between the inner ends of the guide rails to guide the hop vine down towards the first-named roller.

3. A machine for removing hops directly from vines in a field, comprising a frame having a pair of spaced guide rails extending a substantial length of the frame, said guide rails adapted to straddle a row of hop vines and said guide rails being flared outwardly at their forward ends to engage and guide hop vines between the rails, hop picking combing members disposed one adjacent each guide rail and extending upwardly therefrom in spaced opposed vertical planes and engaging opposite sides of a hop vine entering between the guide rails, means for imparting continuous upward movement to the hop picking members in said opposed planes to comb the vines cooperatively in an upward direction to remove the hops, means for advancing the machine longitudinally of a row of hop vines while the picking members are in operation, means for pulling the hop vines in a downward direction between the picking members while the machine is advancing and while the picking members are moving in said opposed planes, flexible flaps completely covering the space between the guide rails to prevent hops when removed from the vines from falling through the space formed between the guide rails, said flaps being yieldable to permit the vines to pass between them and automatically closable around the vines, and means cooperating with said flaps for gathering the removed hops.

4. A machine for removing hops directly from vines in a field, comprising a frame having a pair of spaced guide rails extending a substantial length of the frame, said guide rails adapted to straddle a row of hop vines and said guide rails being flared outwardly at their forward ends to engage and guide hop vines between the rails, a picker frame disposed one adjacent each guide rail and extending upwardly therefrom, an endless vertically disposed picker belt carried by each picker frame and arranged in opposed vertical planes, means for adjusting said picker belts and frames on a vertical axis to assume a horizontal angle with relation to the guide rails to arrange the picker belts in forwardly diverging planes, other means for adjusting the picker belts to assume a vertical angle with relation to hop vines entering between the guide rails with the planes of the belts diverging upwardly, means for imparting continuous upward movement to the picker belts to comb vines cooperatively in an upward direction to remove the hops, means for advancing the machine longitudinally of a row of hop vines while the picking belts are in operation, and means actuated by the advance movement of a machine along the row of hops for pulling the vines downwardly between the upwardly moving picker belts.

5. A machine for removing hops directly from vines in a field, comprising a frame having a pair of spaced guide rails extending a substantial length of the frame, said guide rails adapted to straddle a row of hop vines and said guide rails being flared outwardly at their forward ends to engage and guide hop vines between the rails, a picker frame disposed one adjacent each guide rail and extending upwardly therefrom, an endless vertically disposed picker belt carried by each picker frame and operating in opposed vertical planes, means for adjusting said picker belts and frames to assume a horizontal angle with relation to the guide rails with the planes of the belts diverging forwardly, other means for adjusting the picker belts to assume a vertical angle with relation to hop vines entering between the guide rails with the planes of the picker belts diverging upwardly, means for imparting continuous upward movement to the picker belts to comb the vines cooperatively in an upward direction to remove the hops, means for advancing the machine longitudinally of the row of hop vines while the picking belts are in operation, and a roller carried by the machine and maintained in contact with the ground by the weight of the machine, said roller aligning with the space formed between the guide rails and overriding the vines so as to maintain the roots of the vines in the ground and pull the vines downwardly between the picking belts when the machine is advancing and the belts are moving upwardly in said planes.

6. A machine for removing hops from vines in a field, comprising a frame having a vertical passageway therethrough, said passageway opening through the forward end of said frame and extending rearwardly therefrom whereby hop vines taller than said frame may enter said passageway through the said forward end, vertically disposed endless picker belts carried by said frame adjacent laterally opposite sides of said passageway to engage vines therein, means for moving the vine engaging portions of said belts upwardly, and a supporting roller having a tread width at least equal to the width of the narrowest portion of said passageway journalled on a transverse axis on said frame adjacent the bottom thereof and supporting at least a portion of the weight of said frame, said roller being in longitudinal alignment with said passageway and adjacent the rearmost portion thereof whereby to override the vines in said passageway as said frame is advanced to pull the tops of said vines downwardly through the space between said picker belts.

7. A machine for removing hops from vines in a field, comprising a frame having a vertical passageway therethrough, said passageway opening through the forward end of said frame and extending rearwardly therefrom whereby hop vines taller than said frame may enter said passageway through the said forward end, upwardly movable picker means carried by said frame adjacent laterally opposite sides of said passageway to engage vines therein and pick hops therefrom, and a supporting roller having a tread width at least equal to the width of the narrowest portion of said passageway journalled on a transverse axis on said frame adjacent the bottom thereof and supporting at least a portion of the weight of said frame, said roller being in longitudinal alignment with said passageway and adjacent the rearmost portion thereof whereby to override the vines in said passageway as said frame is advanced to pull the tops of said vines downwardly through the space between said picker means.

8. A machine for removing hops from vines in a field, comprising a frame having a vertical passageway therethrough, said passageway opening through the forward end of said frame and extending rearwardly therefrom whereby hop vines taller than said frame may enter said passageway through the said forward end, upwardly movable picker means carried by said frame adjacent laterally opposite sides of said passageway to engage vines therein and pick hops therefrom, means supporting said frame for steerable movement over the ground, and means carried by said frame in fixed position therebelow and substantially in contact with the ground when in operative position and being in longitudinal alignment with said passageway and adjacent the rear end thereof, said means being of lateral extent at least equal to the width of the space between said picker means whereby to override vines in said passageway as said frame is advanced to pull the tops of said vines downwardly through the space between said picker means.

9. A machine for removing hops from vines in a field, comprising a frame having a vertical passageway therethrough, said passageway opening through the forward end of said frame and extending rearwardly therefrom whereby hop vines taller than said frame may enter said passageway through the said forward end, upwardly movable picker means carried by said frame adjacent laterally opposite sides of said passageway to engage vines therein and pick hops therefrom, and ground engaging supporting means of substantial width carried by said frame in fixed position thereon adjacent the rear end of said passageway and in longitudinal alignment therewith, said means supporting at least a portion of the weight of said frame whereby to override vines in said passageway as said frame is advanced to pull the tops of said vines downwardly through the space between said picker means.

E. CLEMENS HORST, Jr.

REFERENCES CITED

The following references are of record in the file of this patent:

UNITED STATES PATENTS

| Number | Name | Date |
| --- | --- | --- |
| 371,372 | Savage | Oct. 11, 1887 |
| 1,204,356 | Houlden | Nov. 7, 1916 |
| 1,948,975 | Urschel | Feb. 27, 1934 |